United States Patent Office 3,164,726
Patented Jan. 5, 1965

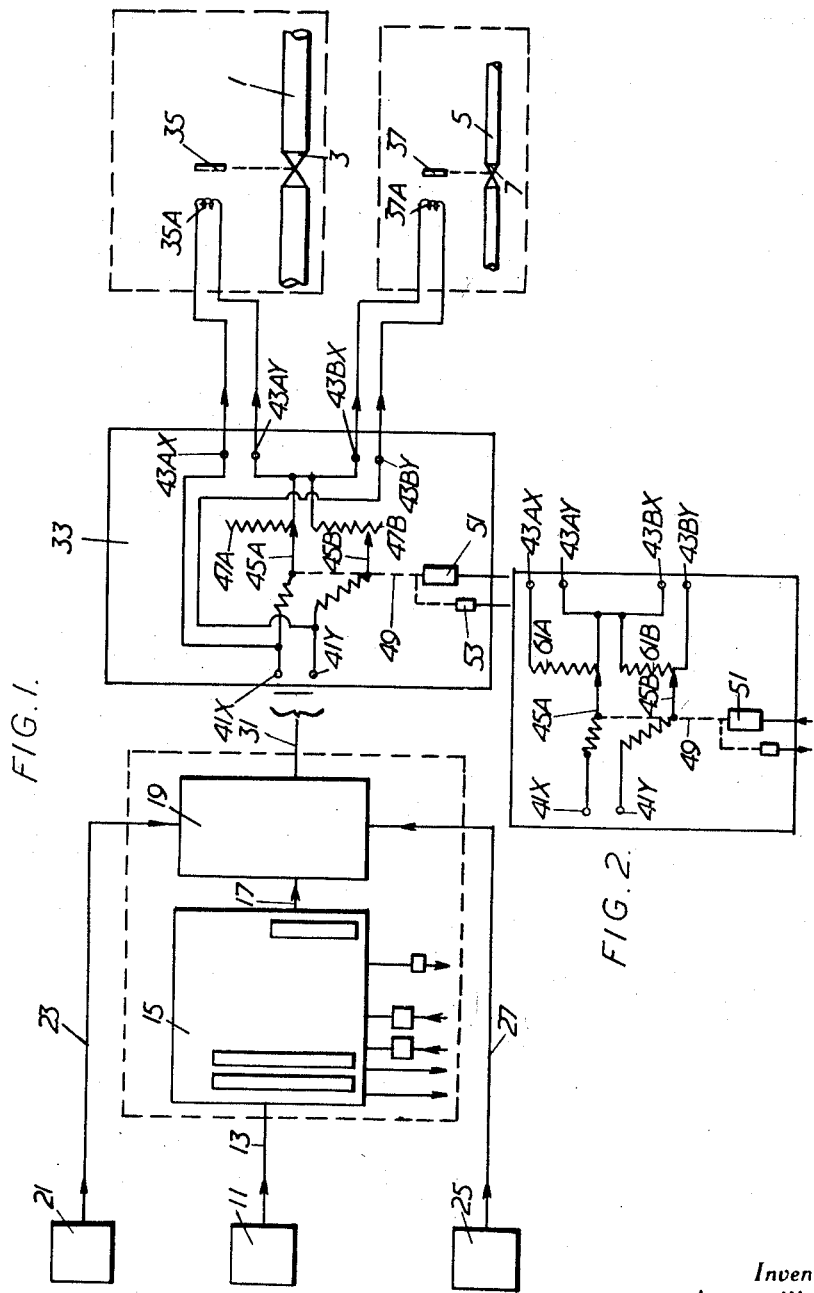

3,164,726
DUAL CHANNEL LIQUID FLOW REGULATION CONTROL
James W. Pegrum, London, England, assignor to Babcock & Wilcox Limited, London, England, a British company
Filed May 10, 1960, Ser. No. 28,134
Claims priority, application Great Britain May 14, 1959
6 Claims. (Cl. 307—38)

This invention relates to automatic control systems. In the automatic control of a process or apparatus it sometimes occurs that a regulator for effecting control of a variable is suitable for carrying out the required control only under some circumstances and that another regulator must be provided for effecting control under other circumstances. An example of apparatus requiring two regulators is found in the control of liquid level in the separator drum of a tubulous steam generator, since a lower practical limit to the range of operation of the main feed regulating valve necessitates the use of a much smaller valve known as a topping-up valve when the steam output is zero or very low. When two regulators for a single variable are provided, the problem arises of controlling the regulators individually in a simple but effective manner and of rendering them separately operative at the appropriate times.

The invention includes an automatic control system having two regulators arranged to regulate a common variable at different times, a common controller for effecting operation of both regulators, and transfer means arranged to receive the output from the controller and to apply that output to a selected one of the two regulators, the transfer means when operated serving to transfer in a progressive manner the regulation of the variable from one regulator to the other.

The invention also includes an automatic control system having two electrically operated regulators arranged to regulate a common variable at different times, a common controller for effecting operation of both regulators, and transfer means arranged to receive the electrical output from the controller and to apply that output to an operating coil of a selected one of the two regulators, the transfer means when operated serving to transfer in a progressive manner the electrical output from the controller from the operating coil of one regulator to the operating coil of the other regulator.

The invention will now be described, by way of example, with reference to the accompanying drawings, in which:

FIGURE 1 is a schematic drawing of part of an automatic control system for a steam generating unit; and FIGURE 2 is a diagram of an alternative form for transfer means shown in FIGURE 1.

FIGURE 1 illustrates the invention as applied to part of an automatic control system for a tubulous steam generating and superheating unit having a steam and water separating drum (not shown) to which feed water is supplied to replace water evaporated in the unit, and so maintain the water level in the drum within predetermined limits.

During normal operation of the unit the feed water is supplied to the drum through a pipe 1 under the control of a main feed water regulating valve 3, and this valve must be capable of passing the water equivalent to the full rated evaporation of the unit. As a result, when the rate at which the feed water is to be supplied is small, the action of the valve is insufficiently precise, and it is necessary to close the valve 3 and supply the feed water through a by-pass 5 containing a small flow-regulating valve 7 known as a topping-up valve. In order to accommodate in a satisfactory manner fluctuations in the steam output from the unit, the supply of feed water is regulated during normal operation of the unit in accordance with measures of the rate of steam flow, the water level in the drum, and the actual rate of flow of feed water. Thus a transducer 11 supplies a signal indicative of the water level in the drum through a lead 13 to a three-term controller 15 of a form described in detail in the specification of the co-pending U.S. application of Ronald E. Zoller, Serial No. 833,268 filed August 12, 1959. The output from controller 15 is fed through a lead 17 to an analogue computer 19. A transducer 21 supplies a signal, indicative of the mass flow rate of feed water to the drum, through a lead 23 to the analogue computer 19. A transducer 25 supplies a signal, indicative of mass flow rate of steam from the unit, through a lead 27 to the analogue computer 19. Provision is made for suppressing the signals from transducers 21 and 25 during low loads and during pressure raising. Each lead 23 and 27 includes a pair of conductors, and in each lead a rheostat is connected between the two conductors so that they can either be left effectively non-connected or short circuited as desired. Suitably the two rheostats are coupled together for operation in unison in the same sense, and are power operated and remotely controlled. The analogue 19 is adapted to effect a calculation involving the three variables mentioned and pass an appropriate output signal through a lead 31 to a transfer device 33.

The function of the transfer device 33 is to permit the transfer in a smooth manner of the output from the computer 19 from one to the other of two electro-mechanical actuators 35 and 37 respectively associated with the moveable valve members of the main feedwater valve 3 and the topping-up valve 7. The transfer device 33 includes two input terminals 41X and 41Y, a first pair of output terminals 43AX and 43AY, and a second pair of output terminals 43BX and 43BY. Input terminal 41X is connected to output terminal 43AX and to slider 45A of a first rheostat 47A, one end of which is connected to the output terminals 43AY and 43BX. Input terminal 41Y is connected to the output terminal 43BY and to the slider 45B of a second rheostat 47B, one end of which is connected to the output terminals 43AY and 43BX. The two sliders 45A and 45B are mechanically coupled by an insulated link 49 so that they move in unison, this link is coupled to a reversible electric motor 51 under the control of a digital controller, and signal means 53 are adapted to give a positive indication to the digital computer when the sliders are set to each limiting position. Suitable limit switches are incorporated in the motor 51.

The actuators 35 and 37 are provided respectively with operating coils 35A and 37A and these coils are connected respectively across the output terminals 43AX and 43AY and across the output terminals 43BX and 43BY.

It will be appreciated that the control system illustrated in FIGURE 1 is but part of a more comprehensive control system for the steam generating unit, such as the control system disclosed in the specification of said application, Serial No. 833,268, the control system being subject to a supervisory control by a digital computer.

The digital computer is adapted to effect control of the unit in accordance with a programme and the computer is arranged to effect operation of the transfer means in accordance with a predetermined programme or in dependence on calculation based on an incoming signal or incoming signals representative of the value of a variable or the values of variables.

The computer may, for example, receive input signals representative of vapour temperature and rate of vapour flow from the unit, calculate therefrom the rate of heat output from the unit and effect operation of the transfer means when that rate reaches a predetermined value.

For the purposes of the present description, it is sufficient to consider that a single controller, which in the present case is the analogue computer 19, provides an output signal suitable for operating each of the two regulators which normally operate only one at a time.

Thus the combination of the actuator 35 and the main valve 3 forms a first regulator and the combination of the actuator 37 and the topping-up valve 7 forms a second regulator. The output from the common controller is applied to the transfer device through the lead 31, and is in the form of a direct current varying in magnitude, to provide a control, between the limits 0 and 15 ma.

In use of the apparatus described, with the two sliders 45A and 45B in the positions indicated, a short circuit exists between the two output terminals 43AX and 43AY through the slider 45A, while the resistance of the effective part of the winding of the rheostat 47B is so large that substantially no shunting effect is caused by it across the terminals 43BX and 43BY. It will be seen that the current reaching the transfer means 33 through the lead 31 will flow substantially wholly through the coil 37A of the actuator 37, so that the controller (analogue computer 19) effectively controls the topping-up valve 7. In the absence of any current in the coil 35A of the actuator 35, the main valve 3 is fully closed.

When the requisite rate of supply of feed water to the drum of the steam generating unit rises to a valve near the maximum capacity of the topping-up valve 7, the digital computer will effect operation of the motor 51 to cause the insulated link 49, and with it the sliders 45A and 45B, to move from one limiting position to its other limiting position. The drive from the motor 51 to the link 49 is such that this movement will take about one minute to complete. It will be seen that the effective part of the upper rheostat 47A serves as a shunt resistance for the coil 35A and a series resistance for the coil 37A, while the effective part of the lower rheostat 47B serves as a shunt resistance for the coil 37A and a series resistance for the coil 35A. As the slider 45B rises (in FIGURE 1), the resistance of the effective part of the rheostat 47B falls so that a progressively increasing shunting effect (i.e. of increasing conductance) is placed across the coil 37A while the resistance in series with the coil 35A is progressively decreased. At the same time, since slider 45A is also rising, the shunting effect across the coil 35A is progressively decreased (i.e. its conductance decreases) while the resistance in series with the coil 37A is progressively increased. As a result, there is a progressive decrease in the current through the coil 37A and a progressive increase in the current through the coil 35A. These changes result in a progressive closing of the topping-up valve 7 accompanied by a progressive partial opening of the main feed valve 3. When the insulated link 49 and the two sliders 45A and 45B are in their uppermost positions, the topping-up valve 7 is fully closed and the main valve 3 is open to an appropriate extent.

Since, after the operation of the transfer means is completed, the rate of flow of feed water through valve 3 should preferably be substantially equal to the rate of flow through topping-up valve 7 before the transfer was commenced, if the operating conditions of the unit remain unchanged, some care is necessary in selecting the load on the steam generating unit at which transfer from one valve to the other takes place. For example, if the two valves have equal rates of flow when their actuators are energised by 10 ma., then suitably change over from one valve to the other should take place when the output current from the controller is 10 ma. However, in the arrangement shown any difference will be automatically corrected by a control influence set up by the feed water flow transducer 21, to restore the feed water flow rate to the correct value.

The signal means 53 provide the digital computer with an indication when the transfer is completed, and provides the computer at all times with an indication whether the transfer means 33 has effectively transferred control from one valve to the other and an indication as to which regulator is effective.

During closing down of the steam generating unit, and when the load on the unit is small, the digital computer can effect transfer of feed water regulation in the opposite sense from main valve 3 to the topping-up valve 7.

It will be seen that each rheostat operates both as a series resistance for one coil and as a shunt conductance for the other coil. It follows that a modified arrangement is possible in which two rheostats respectively are connected in series with the two coils and operate in unison in opposite series. Alternatively, the two rheostats can be connected respectively across the operating coils of the two actuators as variable shunts, each parallel combination of a coil and a rheostat being connected through a suitable resistance to output terminals of the controller.

The controller (analogue computer 19) in the embodiment of the invention described above provides an output signal in the form of a direct current the magnitude of which varies to effect the desired control. The invention may be applied to other forms of controller, for example, to a controller having a high output impedance in which the output signal is in the form of a direct-current voltage the magnitude of which varies to effect the desired control. In such a case the actuators 35 and 37 will need to be of a type having a high input impedance, and the rheostats 47A, 47B of the transfer means 33 can be replaced with potentiometers.

Such an arrangement is shown in FIGURE 2, in which input terminal 41X is connected to the slider 45A of a potentiometer 61A the ends of which are connected respectively to the output terminals 43AX and 43AY, the input terminal 41Y is connected to the slider 45B of a potentiometer 61B, similar to potentiometer 61A, the ends of which are connected respectively to the output terminals 43BX and 47BY, and the output terminals 43AY and 43BX are connected together.

With the two sliders 45A and 45B in the positions shown, an input voltage applied between the terminals 41X and 41Y will be applied wholly between the terminals 43BX and 43BY, while terminals 43AX and 43AY will be at the same potential, so that in the arrangement of FIGURE 1 the topping-up valve 7 would be under the control of the controller (analogue computer 19). As the two sliders are moved upwardly in unison by the motor 51, a constant impedance is presented to the input terminals 41X, 41Y but the voltage between the terminals 43BX and 43BY progressively falls while the voltage between the terminals 43AX and 43AY progressively rises. When the two sliders are in their uppermost positions, the input voltage applied between the terminals 41X and 41Y will be applied wholly between the terminals 43AX and 43AY while the terminals 43BX and 43BY will be at the same potential, so that the main valve 3 is under the control of the controller. It will be seen that the control has been transferred smoothly from one valve to the other.

In the control system described above, a further valve is provided for the lowering of the water level in the steam and water drum, this valve being used only at times when the control of the supply of feed water is by the topping-up valve. This level lowering valve can be coupled to the controller (analogue computer 19) by providing it with an electro-mechanical actuator, the operating coil of which is in series with that of the actuator of the topping-up valve. This actuator is adapted to operate in response to a range of current values different from the range to which the other actuators respond. For example, the controller may be arranged to provide a control current in one direction when one of the feed water valves is to be opened, and a current in the reverse direction when the water level is excessive. Then the actuators of the main valve 3 and the topping-up valve 7 can be adapted to respond only to currents in the forward direction while the actuator of the level lowering valve can be adapted to respond only to currents in the reverse direction.

The actuators have been referred to in the above description as electro-mechanical to indicate that an electrical input causes a mechanical output, and this term includes both electro-hydraulic and electro-pneumatic types of actuator.

Although in the preferred embodiments of the invention described above the transfer means are automatically controlled by a digital computer, they can in other control systems be remotely controlled through the motor 51 by an operator from a central control panel, automatically controlled by a relay, through the motor 51, as the variable to be controlled passes through some preselected value, or upon replacement of the motor 51 with a manual control knob they may be manually operated. As an example of control by a relay, in a control system such as that illustrated in the drawings a transducer sensitive to the rate of steam flow from the unit may effect the change over when the steam flow changes through a preselected value.

In another application of the invention, one of the regulators alternatively controlled by a controller includes a valve for controlling attemperation of vapour supplied by a vapour generating and vapour heating unit and the other of the said regulators includes means for regulating the supply of excess air to the furnace chamber of the unit. Thus, during normal operation of the unit, the valve controls the flow of liquid to a spray attemperator whilst the means for regulating the supply of excess air to the furnace chamber of the unit is inoperative. On the other hand, during starting up of the unit when there is no useful steam output and it is undesirable to deliver liquid to the spray attemperator, the valve is rendered ineffective and the means for regulating the supply of excess air to the furnace chamber is controlled to effect the introduction of considerable quantities of excess air to the combustion chamber and thereby to limit the temperature of the vapour discharged from the superheater.

For example, the operating coil of a transmitting relay is connected in series with the windings of the actuators of the attemperater valve and the damper or like means for regulating the supply of excess air to furnace chamber, for example the coil is inserted into the conductor of lead 31 which is connected to the terminal 41X in FIGURE 1, the actuators being responsive to current changes in their windings in the range, say, of 0–7 milli-amperes and the transmitting relay being responsive to current changes in the range of 7–15 milli-amperes. The transmitting relay serves to effect control of the actuator of a damper arranged to govern the recirculation of relatively cool gases to the furnace chamber.

What is claimed is:

1. An automatic control system comprising two electrically operated regulators arranged to normally regulate a common variable at different times and to normally provide continuous and complete regulation of the common variable by either one or the other of the regulators, each regulator including an operating coil, means for establishing an electric signal representative of the magitude of the variable, a common automatic controller for effecting operation of both regulators and responsive to said variable representative signal for continuously producing an output control signal having a predetermined functional relationship to said variable representative signal, and transfer switch means continuously receiving the electrical output control signal from said controller and normally applying that output to the operating coil of a selected one of the two regulators to effect positioning of said regulators, the transfer means being operative to transfer in a progressive manner the entire electrical output of the controller from the operating coil of one regulator to the operating coil of the other regulator.

2. An automatic control system as claimed in claim 1, wherein the transfer means includes two transfer devices in the form of two potentiometers each having a slider and respectively connected across the operating coils of the two regulators, the two sliders respectively associated with the two potentiometers are mechanically coupled together to move in unison each from a first end to a second end of the potentiometer resistance, the first end of one potentiometer resistance is connected to the second end of the other potentiometer resistance, and the input from the controller is applied to the two sliders.

3. An automatic control system as claimed in claim 1, wherein the transfer means includes two transfer devices in the form of two rheostats, one of which is connected in series circuit with the operating coil of one of the regulators and input terminals of the transfer device, and the second of which is connected in series circuit with the operating coil of the second regulator and the input terminals of the transfer device, the two sliders respectively associated with the two rheostats being mechanically coupled together to move in unison in such a sense that an increase in the effective resistance of one rheostat is accompanied by a decrease in the effective resistance of the other rheostat.

4. An automatic control system as claimed in claim 1, wherein the transfer means includes two transfer devices in the form of two rheostats, one of which is connected across the operating coil of one of the regulators and the second of which is connected across the operating coil of the second of the regulators, each parallel combination of a coil and a rheostat being connected through suitable resistance to output terminals of the controller, and the two sliders respectively associated with the two rheostats being mechanically coupled together to move in unison in such a sense that an increase in the effective resistance of one rheostat is accompanied by a decrease in the effective resistance of the other rheostat.

5. An automatic control system as claimed in claim 1, wherein the transfer means includes two transfer devices in the form of two rheostats, one of which is connected across the operating coil of one of the regulators and in series circuit with the operating coil of the second regulator and input terminals of the transfer device, while the second of the two rheostats is connected across the operating coil of the second regulator and in series circuit with the operating coil of the first regulator and the input terminals of the transfer device, the two sliders respectively associated with the two rheostats being mechanically coupled together to move in unison in such a sense that an increase in the effective resistance of one rheostat is accompanied by a decrease in the effective resistance of the other rheostat.

6. An automatic control system as claimed in claim 1, wherein the transfer means are arranged to be power operated and remotely controlled.

References Cited in the file of this patent

UNITED STATES PATENTS

| | | |
|---|---|---|
| 1,231,628 | Lehr | July 3, 1917 |
| 2,483,450 | Wolfner | Oct. 4, 1949 |
| 2,573,122 | Weber | Oct. 30, 1951 |
| 2,624,360 | Goddard | Jan. 6, 1953 |
| 2,683,797 | Grow | July 13, 1954 |
| 2,716,206 | Salati | Aug. 23, 1955 |
| 2,864,343 | Jenkins | Dec. 16, 1958 |
| 2,935,661 | Quick | May 3, 1960 |